Patented Aug. 7, 1945

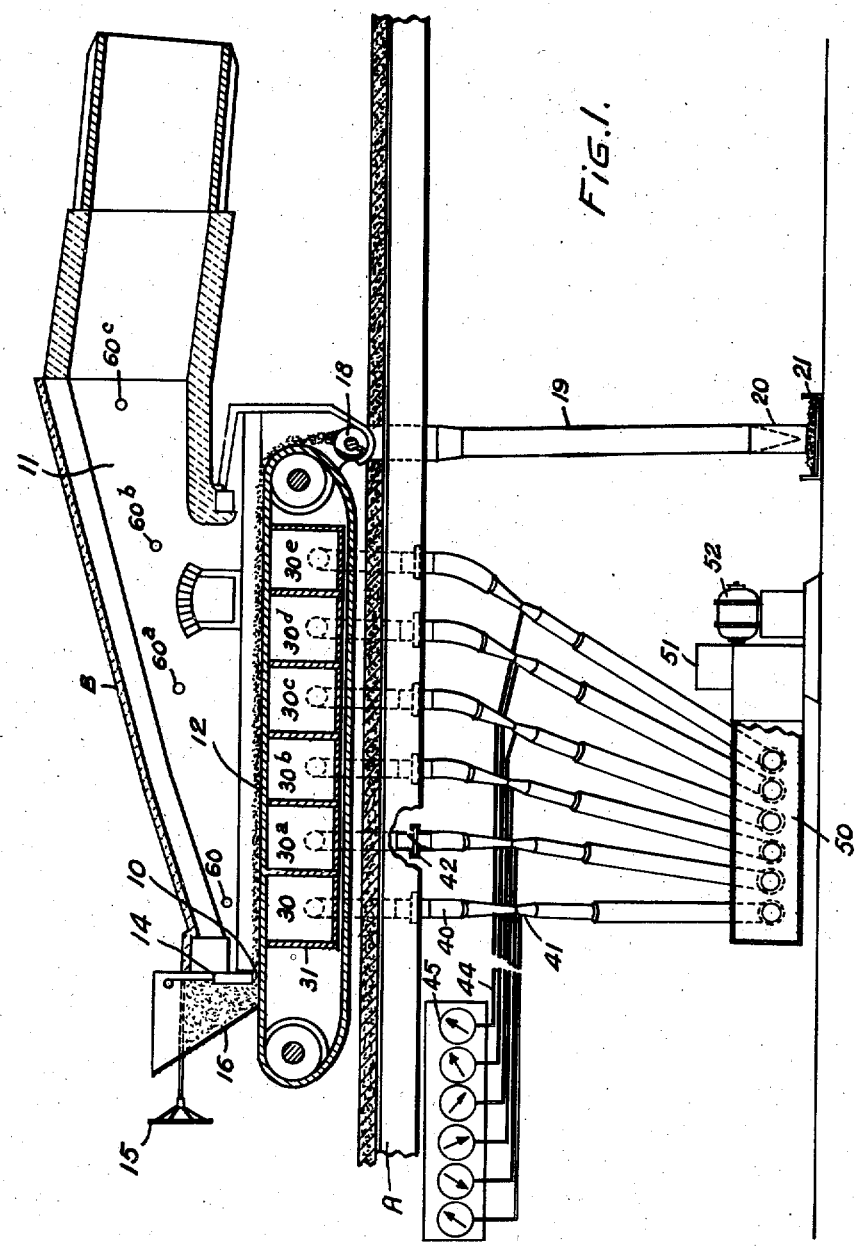

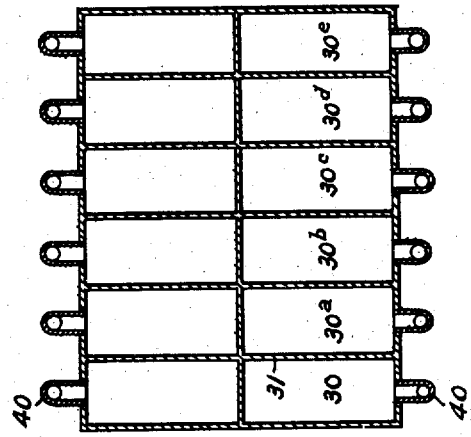
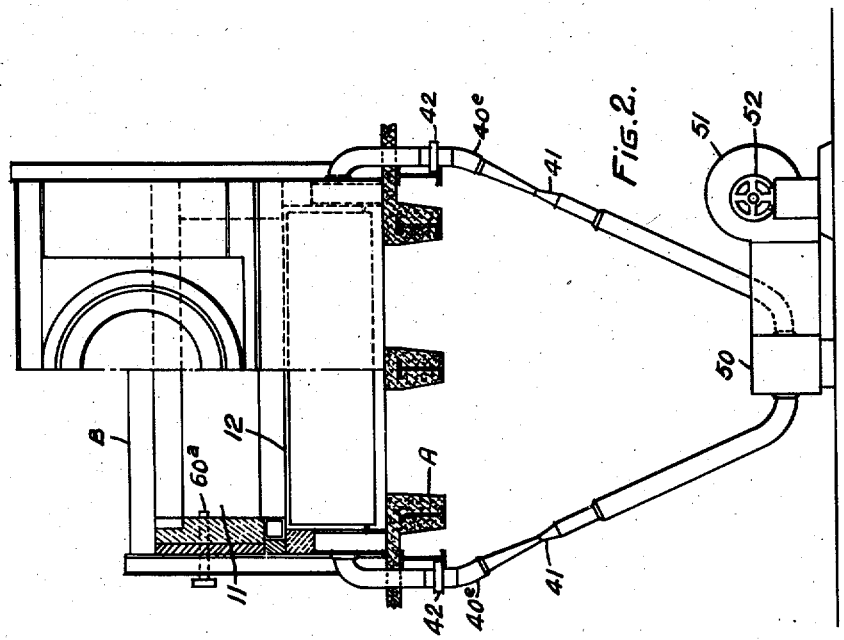

2,380,930

UNITED STATES PATENT OFFICE 2,380,930

CARBONIZATION

Arthur Holjord Andersen and Norman Rothwell Fasken, Shawinigan Falls, Quebec, Canada, assignors to Shawinigan Chemicals Limited, Montreal, Quebec, Canada, a corporation of Canada Application October 5, 1942, Serial No. 460,802 In Canada July 16, 1942

6 Claims. (Cl. 202—6)

INTRODUCTION

This invention relates to carbonization. More particularly it relates to improvements on a continuous carbonization process in which a relatively thin bed of carbonizable material, usually coal, is passed through a substantially horizontal chamber wherein a portion of the volatile of the charge is burned at least partially within the bed to supply the heat for removal of remaining volatile. The air supply, the speed of the bed, and other conditions are so regulated that the burning of fixed carbon is reduced substantially to a minimum and a high grade of coke is produced. A process of this type is disclosed in U. S. Patent No. 2,209,255.

This type of method contrasts with previous methods of producing coke, which have been strictly processes of distillation. In some of these processes continuous chain grate devices are employed, but the heat has always been applied from outside the bed and the volatile thus distilled off. Care has always been taken that combustion within the bed did not occur as this was apparently considered certain to oxidize fixed carbon.

OBJECTS

The present invention has for a primary object an improved method and means for controlling a process in which a charge of carbonizable material is passed through a horizontal chamber and a portion of the volatile burned at least partially within the bed to supply the heat for distillation, to compensate for variable factors resulting from the type of material treated. Further objects of the invention are to provide improved control of the quality of the coke produced—for modification of the conditions of the process in accordance with the nature and distribution of the charge—control of the temperature to prevent rises which might damage the setting or the grate—control of conditions in a manner that a maximum output can be achieved without reducing the quality of the product—control of the air distribution along the path of the charge to a predetermined pattern and adjustment of the air distribution in such a way that the optimum operating conditions as determined experimentally can be reproducibly obtained—a method of determining and applying optimum conditions for treating different types of material.

THE APPLICANTS' METHOD

The applicants' method is featured by regulating the air supplied to the material at different stages of its carbonization, in accordance with the condition of the material at the respective stages. More specifically, the air supply differs from one zone to another in the path of the bed, the extent of the difference being related to the amount of volatile given off in the respective zones. Optimum conditions, for treating a particular type of material, are arrived at by actually measuring, in experimental or pilot runs, the amount of air fed to each zone, comparing the results obtained, and selecting as a pattern for operation those which best suit the product desired. The method is also featured by the stabilization of the flow of air to any part of the bed against temporary fluctuations in resistance to flow due to uneven sizes of the material or uneven distribution on the grate. The effect of this treatment is to enable the volatile of the coal to be driven off at close to a maximum rate and to the desired extent while at the same time the burning of fixed carbon is maintained substantially at a minimum.

This control may conveniently be effected by providing beneath a carrier for moving the bed through a carbonizing chamber one or more rows of separate air compartments arranged in the direction of travel of the carrier thus providing a number of air supply zones beneath the grate. Means is provided for supplying measured amounts of air to each compartment independently of the others. Throttling means is also provided in conjunction with each compartment for preventing any material fluctuation of its rate of air supply, due to temporary variations in the condition of the bed or the grate over that particular zone.

The result of this method in terms of the end product is the ability to produce coke of closely controlled quality as regards low volatile content and loss of fixed carbon. In terms of the treatment, the method results in the ability to reduce fluctuations in temperature irrespective of the presence of conditions in the coal tending to cause such fluctuations and also in the ability to maintain a steadier production rate.

DETAILED DESCRIPTION

The invention will now be further explained by reference to a preferred apparatus for use in carrying it out, shown in the accompanying drawings, in which:

Figure 1 is a diagrammatic cross section through a special coking apparatus conveniently suitable for carrying out the present invention.

Figure 2 is a diagrammatic elevation, partly in section, showing the apparatus of Figure 1.

Figure 3 is a diagrammatic cross section taken horizontally through the apparatus of Figures 1 and 2 just beneath the bed supporting portion of the grate.

Referring in more detail to the drawings, A represents the foundation of the apparatus and B the refractory setting. The setting is provided with a fuel feed opening 10, and a gas outlet flue 11. Within the setting is mounted a carrier, in this case a continuous travelling grate 12, of suitable design, conveniently driven by a standard drive 13. The setting has a relatively low ceiling to provide a chamber of limited volume resulting in good radiation of heat onto the fuel bed. In this particular apparatus, the flue 11 is located remotely from the feed end of the grate and the roof of the oven slopes upwards towards the flue, but this arrangement is optional and the flue can be at either end of the chamber and the roof of any suitable design. The setting is also gas-tight and preferably under positive pressure in order to minimize leakages.

A chute 16 leads from a fuel hopper to the opening 10. The opening 10 is provided with a gate 14 operated by suitable mechanism 15 for raising and lowering it. At the discharge end of the grate 12, and below it is a screw conveyor 18, for receiving the coke and conveying it to one side of the apparatus. Leading from the conveyor 18 is a chute 19 for conveying the coke downwards to a sealing device 20. Below the sealing device is a mechanism 21, for carrying away the coke. The coke can be quenched either in the conveyor 18 or subsequently. The nature of the discharge apparatus is not material to the invention.

Below the grate 12 are a number of air boxes or compartments 30, 30a, 30b, etc. These compartments each occupy half of the width of the grate and a portion of the length thereof thus dividing the entire space below the grate both laterally and longitudinally, into a number of air supply zones. While 12 compartments have been shown, that is six on each side of the grate, it is understood that this number may be varied to suit the nature of the apparatus and the result desired. Each compartment is entirely separated from the adjacent one by side walls 31 and a centre wall 32. Leading to each zone there is an air duct 40 extending from an air supply box 50. Each duct includes a metering device, in this case a Venturi meter 41. Each duct also includes an air valve or throttle 42. For measuring the amount of air at the meter 41 are air lines 44 leading to a metering indicator 45 of a suitable type, for instance, a liquid column.

The air is supplied to the air supply box 50 by means of a blower 51 suitably driven as by an electric motor 52. The amount of air is controlled by a series of shutters 53 located between the blower 51 and the air supply box 50.

Thermometers 60, 60a, 60b, 60c are provided at suitable points in the setting so that the temperature above the bed in the direction of its travel can always be determined.

OPERATING PROCEDURE

In carrying out the process, the grate is started, coal being fed on to it to form a thin bed of a thickness regulated by the height of the gate 14. To induce working conditions coal is run on to the grate, the coal in the bed thus formed is ignited and the chamber gradually brought to the desired operating temperature by running the grate slowly while supplying air from the zones 30, 30a, etc. in sufficient quantities to support the combustion necessary to provide the heat for the process. The chamber being gas-tight and preferably under positive pressure, leakages of air into the chamber above the coal bed are minimized. While this starting procedure has been found most practical, working conditions may be arrived at in any suitable manner.

The speed of the grate and the air supply is slowly increased so that operating temperature is reached gradually to avoid damaging the setting. The grate 12 is then brought to operating speed, the total amount of air entering the zones 30, 30a, etc. being so regulated through the air valves 42 that only a portion of the volatile matter from the coal is burned, for example, just sufficient to evolve the heat necessary to drive off the remainder of the volatile constituents of the charge, before leaving the chamber.

Proceeding in this manner, selective burning of a portion of the volatile matter in the coal takes place, and the burning of fixed carbon is reduced substantially to a minimum. Sufficient heat is generated by the burning of this volatile to remove the remainder, or at least the desired amount, to give a coke having the characteristics sought. The air or other oxygen-containing gas, preferably unheated, first comes into contact with the substantially horizontal bed, the bottom layers of which are relatively cool. With the cool air contacting the cool layers of coal, there is no incentive to combustion, which is, therefore, delayed until the air reaches the upper part of the bed where the temperature is high. This refers to sections of the bed in their early stages of travel through the coke chamber. Combustion begins to take place at the upper part of the bed, selecting the volatile constituents. This combustion occurs at least partially within the bed; there usually being combustion of distilled gases, above the bed. The air supply rate is so regulated that only sufficient is fed to supply the necessary oxygen for combustion of the volatile constituents, so that the coke is not attacked. As any given portion of the bed advances through the chamber, the combustion works its way downwards until finally it reaches the lower strata. Since at all times the air supply is proportionate to the demands of the volatile, the fixed carbon is not attacked, or at least its oxidation is reduced substantially to a minimum.

According to the invention, the air supply to each zone is regulated individually to meet the requirements of that zone, i. e. is substantially proportionate to the rate at which the volatile matter is released from the coal in that zone. Some types of coal ignite much faster than others. Generally speaking, all types give off less volatile at the start and finish and more towards the middle of the coking operation. Consequently, less air is required at the start and finish and more towards the middle. In any event, presuming that the total air supplied to the bed during its transit through the chamber is correct, the supply to each individual compartment is so adjusted as to obtain the desired conditions of temperature and of combustion of gases above the various compartments or zones, both individually and collectively.

The air flow to the various compartments is read on the individual indicators 45 which are actuated by the metering devices 41. The temperatures at various points in the coking chamber are measured by reading indicators connected to the thermometers 60, 60a, etc.

Besides regulation of the flow of air supplied to the respective chambers, control is also exercised to prevent temporary rushes i. e. surges of air to any one zone due to changes in resistance to air flow of the bed of coal in that zone. These changes in resistance may be caused by bare spots on the grate or uneven thickness due to irregularities in feeding, uneven size distribution in the coal bed, or clogging of the air openings in different parts of the grate. This control is effected by means of the throttles 42 which restrict the flow. By this means, there are prevented rushes of air which would result in a rise in the temperature in one or more zones or cause too great a proportion of gas and even fixed carbon to be burned. The opening at the throttle has a resistance to the flow of air many times that of the grate and coal above the compartment, so that a variation in the resistance to air flow in the coal bed itself cannot cause an appreciable variation in the flow to the compartment and thus through the coal bed above it. For example, if the combined resistance, that is the pressure drop across the grate and coal bed is of a certain magnitude, the pressure drop across the restricted opening at the throttle can suitably be several times that magnitude. Thus, the separate supply of air to each zone is independent of the resistance across the bed and grate at that zone.

Each supply is accurately measured. Optimum conditions for treating a specific material are readily arrived at by carrying out several runs in which the air supply and other factors are varied. These variable factors are measured, the coke analyzed and the results compared. Selected measurements are then applied to the regulation of commercial runs.

RESULTS

Proceeding as described, a fine adjustment of the burning of the volatile constituents of the charge is obtained. The conditions are so adjusted that the product discharged from the grate is coke of the desired volatile content. On leaving the coking chamber, the coke is hard and it is highly reactive and porous. The unburned volatile matter driven off passes out through the flue 11 to be completely burned to supply heat for a boiler or lime kiln or to be cooled and collected. Use of the gas for direct heating purposes is considered most practical as it contains a large amount of sensible heat.

EXAMPLES

In order to illustrate the invention further, a series of typical examples will be given of treating various types of coal according to the invention. It will, of course, be understood that the figures cited were obtained from carrying out the process on a particular apparatus and are thus not to be taken in a limiting sense, but only by way of explanation.

Example I

According to the figures shown in the following Table I, a good grade bituminous coking coal was fed on to a chain grate about 18 feet long by about 10 feet wide, in an apparatus of proportions similar to those of the device shown in the drawings, in which the height of the roof at the feed end was approximately 1 foot and at the discharge end approximately 5 feet from the grate. The procedure followed for starting the run was about the same as that described above. As soon as the temperature in the coking chamber had reached its normal values, the air entering each compartment was adjusted for steady operation at the rates indicated in the table. The conditions and results of the run were substantially according to the figures given in Table I and are essentially typical for this particular apparatus.

Table I

| Conditions | Approximate average |
|---|---|
| Coal feed_____lbs./minute__ | 118 |
| Depth of coal bed_____inches__ | 3½ |
| Grate speed_____feet/hour__ | 73 |
| Percent on 1" coal in feed_____ | 45.0 |
| Percent P. T. ¼" coal in feed_____ | 6.0 |

| Temperatures, °C. | Approximate average |
|---|---|
| Thermometer No. 60_____ | 925 |
| Thermometer No. 60a_____ | 1,200 |
| Thermometer No. 60b_____ | 1,205 |
| Thermometer No. 60c_____ | 1,210 |

| Air for combustion | Approximate average | Approximate lbs. per sq. foot, per min. |
|---|---|---|
| Total_____lbs. per minute__ | 330 | 1.8 |

| Air for combustion | Percentage of total | Approximate lbs. per sq. foot, per min. |
|---|---|---|
| Pair of compartments No. 30_____ | 3 | .3 |
| Pair of compartments No. 30a_____ | 21 | 2.3 |
| Pair of compartments No. 30b_____ | 26 | 2.8 |
| Pair of compartments No. 30c_____ | 23 | 2.5 |
| Pair of compartments No. 30d_____ | 22 | 2.4 |
| Pair of compartments No. 30e_____ | 5 | .5 |

Results

For the above run the coke produced in 24 hours was estimated at 45 tons. The analysis of the coal fed and the coke produced was as follows:

| Coal | Coke |
|---|---|
| Percent | Percent |
| Moisture_____2.5 | Moisture_____0.0 |
| Volatile matter_____39.1 | Volatile matter_____2.4 |
| Ash_____2.7 | Ash_____6.4 |

Example II

The procedure of Example I was followed approximately under the changed conditions of Table II with substantially the results tabulated.

Table II

| Conditions | Approximate Average |
|---|---|
| Coal feed ............................................... lbs./minute.. | 102 |
| Depth of coal bed ............................................. inches.. | 2¾ |
| Grate speed ................................................ feet/hour.. | 76 |
| Percent on 1" coal in feed ............................................. | 3.0 |
| Percent P. T. ¼" coal in feed .......................................... | 30.0 |

| Temperatures, °C | Approximate average |
|---|---|
| Thermometer No. 60 .................................................. | 925 |
| Thermometer No. 60a ................................................. | 1,150 |
| Thermometer No. 60b ................................................. | 1,170 |
| Thermometer No. 60c ................................................. | 1,175 |

| Air for combustion | Approximate average | Approximate lbs. per sq. foot, per min. |
|---|---|---|
| Total ..................... lbs. per minute.. | 385 | 2.1 |
| Pair of compartments No. 30 ............ | 11 | 1.4 |
| Pair of compartments No. 30a ........... | 21 | 2.6 |
| Pair of compartments No. 30b ........... | 25 | 3.2 |
| Pair of compartments No. 30c ........... | 20 | 2.5 |
| Pair of compartments No. 30d ........... | 16 | 2.0 |
| Pair of compartments No. 30e ........... | 7 | 0.9 |

Results

For the above run the coke produced in 24 hours was estimated at 39 tons. The analysis of the coal fed and the coke produced was as follows:

| Coal | Coke |
|---|---|
| Percent | Percent |
| Moisture ................... 3.6 | Moisture ................... 0.0 |
| Volatile matter ............ 39.6 | Volatile matter ............ 2.3 |
| Ash ....................... 3.3 | Ash ....................... 4.9 |

VARIABLE FACTORS

The examples are representative of characteristic procedures. It will of course be understood that there are several variables with which to contend as for instance, the nature of the material treated, the size and particular structure of the apparatus, the thickness of the bed, the speed of the grate, i. e. time of treatment, the amount of air supplied, and temperature. The following remarks on variable factors will be of interpretive assistance and taken with the remainder of the disclosure will place the carrying out of the invention well within the understanding of one skilled in the art.

CARBONIZABLE MATERIALS

While this disclosure has been framed principally in the terms of the treatment of coal to produce coke, it will be understood that various types of material other than coal may be carbonized by the use of the invention. The specific nature of this material is relatively unimportant within limits. It will be well understood from this disclosure that the material treated must be a solid capable of being handled in a stoker and must have sufficient volatile to support combustion so as to give off the heat required to carry out the process without burning fixed carbon in excess of that permissible by the nature and yield of the end product desired. Many types of coal, wood and also fuel agglomerates satisfy these criteria. Hence, the terms "coke," "coking" and "coking temperature" are used in a generic sense. It is possible to handle varying sizes of material, the upper limit for substantially optimum results being, in the case of coal, of the order of 3". The minimum size is determined by the ability of the grate to carry a fine charge successfully and also by the physical characteristics of the coke desired. Minus ¼ inch coal has been successfully coked by this process.

THICKNESS OF THE BED

In connection with bed thickness, the more compact the layer of coal, the better heat insulator it becomes and therefore, the thinner the layer of coal will have to be. For a medium sized coal, for example minus about 1 inch with less than about 20% of through ¼ inch, a layer of coal about 2 inches thick is preferred, and for a smaller coal (more than about 20% of fines) a layer of coal about 2¾" thick is believed to be better. It has been found that when a relatively thin bed of coal and a consequently faster grate speed are used, a greater output can be achieved than when a relatively thick layer of coal is used with a slow grate speed. The bed thickness can, of course, be varied to suit the results desired.

GRATE SPEED

The grate speed, that is the time of treatment, can be varied. Of course, sufficient time must be allowed to carbonize the material to the desired extent. In certain cases, where substantially complete carbonization is desired, a speed of about 120 feet per hour has been found feasible in the apparatus described, in such cases the coal being coked in about 9 minutes. The preferred speed is about 75 to about 85 feet per hour in which case coking any portion of the charge is completed in about 12 to about 15 minutes. The objection to lower speeds is the decrease in the production rate.

AIR SUPPLY

For maximum production rates, it is desirable to feed as much air as possible without raising the temperature in any zone above the limiting temperature for the apparatus employed, and without burning an undesirable amount of fixed carbon. As a general rule, ir the neighborhood of three pounds of air are required for each pound of coal carbonized.

The relative proportions of the air fed to successive compartments will depend on the type and condition of the coal, particularly with respect to its screen size and moisture content. In any event, it will be related to the amount of volatile matter given off above that particular compartment, and therefore, in such a manner that uniformity of partial combustion is approached throughout the path of the charge. In the particular apparatus shown, the air supply ratio may vary from practically zero percent of the total in the first compartment to about 30% (where there are six pairs of compartments) in the middle compartments when good grades of bituminous coking coal are being treated.

The following table typifies the variation of the air supply to different zones of the bed in accordance with four different types of coal. The amounts of air supplied to the different zones for the different types of coal are based on conditions suitable for the production of good grade coke. The wet and dry coals referred to are extremes in this respect. The dry coal contained less than about 3% moisture, the wet about 10% to about 12% or more of moisture.

*Table III*

| Types of coal | Approximate percentage of total air supplied, pairs of compartments | | | | | |
|---|---|---|---|---|---|---|
| | 30 | 30a | 30b | 30c | 30d | 30e |
| Dry coal (about 40%-50% of fines) | 20 | 25 | 22 | 18 | 13 | 2 |
| Wet coal (about 40%-50% of fines) | 1.5 | 30 | 26 | 22 | 17 | 3.5 |
| Dry coal (less than about 15% fines) | 11 | 24 | 22 | 19 | 15 | 9 |
| Wet coal (less than about 15% fines) | 1.4 | 20 | 25 | 22 | 18.6 | 13 |

Besides the variation of air supply to respective compartments, the total air supply and grate speed may be altered to suit the particular type of material being treated. In principle, for maximum production, conditions are controlled so as to regulate the air so that the temperature in respective zones will be as nearly the same as possible. The attempt is also to maintain, in any one zone, a uniform temperature. Minor temperature fluctuations are modified by throttling the air passage to individual zones, while any major or prolonged changes, which would probably be due to the change of condition in the coal being fed are taken care of by re-adjusting the relative amounts of air supplied to the different compartments. This separate supply of air to different zones both latitudinally and longitudinally of the bed permits accurate control no matter what type of coal is being treated. The supply to each zone is actually measured. In this way, air is supplied to the charge at successive stages of carbonization in relation to the requirements of the charge at those stages. The specific amounts of air in pounds per square foot for each zone, for any one type of coal will vary with the grate speed and thickness of the bed. However, while air has been named as the source of oxygen, it will be understood that for certain purposes it might be undesirable to employ other oxygen-containing gases.

TEMPERATURE

The process is essentially one of high temperature coking, i. e. coking produced by combustion of the volatiles, where temperatures of from about 800° C. to about 1400° C. are employed, as distinguished from low temperature coking where lower temperatures are employed. The temperature is controlled in such a way as to stabilize conditions along the path of the charge and to prevent damage to the setting or to the grate. In general, a maximum temperature of about 1200° C. has been found practical for the type of refractory and other materials used in the particular apparatus on which the examples are based. The temperature may be reduced considerably, but this would necessitate a longer time for treatment and consequently a lower output.

It will be evident from this discussion of the individual factors affecting the process, that the maintenance of the grate speed, the total air supply, the individual air supply to the separate zones, and the amount of coal fed, must be coordinated to achieve optimum results.

END PRODUCTS

Extremely accurate control may be exercised over the characteristics of the end product. Control over the amount of volatile left in the coke is particularly accurate. The amount of fixed carbon burned can be reduced substantially to a minimum which under practical commercial conditions is below about 10% of the total fixed carbon, as measured by the method of the A. S. T. M. It is possible to reduce the amount of fixed carbon burned to a lower proportion under certain conditions, for example by running at a lower rate of production than the maximum, or, by producing a product with a higher residual volatile content such as a smokeless fuel. The gas is highly suitable for various processes requiring heat, such as calcination, steam generation, etc.

ADVANTAGES

The great advantage of the present invention is in making it possible, in a continuous process, to produce coke of uniform quantity at a high production rate. Inherently the purpose of a carbonization process of this general nature is to burn sufficient of the volatile matter within and above the coal bed to remove the remainder of the volatile matter by distillation, while reducing the burning of the fixed carbon substantially to a minimum. If the air supply required for this result is not properly distributed then more volatile may be burned in one zone, causing a localized temperature rise. In such circumstances, damage may be done to the setting of the coking chamber. Due to such mal-distribution of the air supply, fixed carbon of the charge might also be attacked to an undesirable extent in this or another zone.

The applicants have discovered that the proportioning of the air to the different zones for optimum coking conditions varies with the nature of the coal, its screen size, moisture content, etc. That is to say, those factors which will effect the rate of the partial combustion of the coal have a definite bearing on the manner in which the total air supply will be divided between the various zones.

For instance, take 2 coals A and B, coal A being more easily burned than coal B. Then for coal A more air should be admitted to the first zones than for coal B, in order to maintain a constant value for the proportion of volatile matter that would be burned above the bed at these zones. Also, assuming a constant production rate of coke from the two coals, coal A will require less air in the final zones than will coal B since its coking is more nearly completed. If the air supply were not reduced in the final zones for coal A then fixed carbon would be burned. Furthermore should an amount of air in excess of that required to burn the required proportion of volatile matter above any one zone be supplied to any zone, then excessive temperatures will result. Conversely, if insufficient air be supplied to any one zone then a proper proportion of the coking is not carried out in that zone with the result that either the rate of production is reduced or the product will contain partially carbonized coal or green coal or both. Optimum operating conditions, as predetermined experimentally, can be tabled or charted with respect to the meter readings for each air compartment and thus used as a guide for the correct operation for any type or condition of coal. Since it is of great advantage to have a correct proportioning of the air supply the maximum benefits are to be obtained when this is held constant and unaffected by continual fluctuations in resistance to air flow of the fuel bed. This is accomplished by the throttles in the air ducts. The effect of these throttles has already been explained.

It will be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

We claim:

1. A continuous process of carbonization wherein carbonizable material is advanced in a progressive path through a carbonizing chamber in the form of a relatively thin bed air is supplied to the bed and volatile constituents of the material are burned selectively at least partially within the bed to supply the heat of carbonization, comprising, supplying the air independently to each of a plurality of separate zones in said path in amount to effect combustion of the volatiles, throttling each air supply to reduce surging of air to a zone of lowered resistance, setting the total supply of air and the speed of progress of the material at rates effective to reduce combustion of the fixed carbon substantially to a desired minimum, setting the air supply to each zone at a rate substantially proportionate to the rate of volatile release in that zone and maintaining a high coking temperature which is nearly the same in the several zones after an initial zone whereby a substantial uniformity of the proportion of volatile burned is maintained throughout said path.

2. A continuous process of carbonization wherein carbonizable material is advanced in a progressive path through a carbonizing chamber in the form of a relatively thin bed air is supplied to the bed and volatile constituents of the material are burned selectively at least partially within the bed to supply the heat of carbonization, comprising, carrying out a pilot run by passing carbonizable material through said path, adjusting the total supply of air and the speed of progress of the material to reduce the combustion of the fixed carbon substantially to a predetermined amount and further apportioning the air to several separate successive zones in said path in amount to effect combustion of the volatiles, adjusting the regulated amount of air supplied to each zone until it is substantially proportionate to the amount of volatile given off in that zone, and there exists a high coking temperature which is nearly the same in each of the several zones after an initial zone measuring the amount of air to each zone in a series of runs in which material is passed through the apparatus under varied conditions to determine substantially optimum carbonizing conditions for the particular type of material, and then carrying out a production run in which similar material is treated at said substantially optimum conditions.

3. A continuous process of carbonization wherein the carbonizable material is passed continuously in a progressive path through a carbonizing chamber in the form of a relatively thin bed air is supplied to the bed to individual zones in said path in amount to effect combustion of the volatile constituents of the material selectively and at least partially within the bed to supply the heat of carbonization, comprising, carrying out a series of pilot runs in which carbonizable material of various types in terms of screen size and moisture content is carbonized according to said process to determine the optimum conditions with regard to feeding of air to the respective zones for each type of carbonizable material there being maintained in the several zones after an initial zone a high coking temperature which is nearly the same, measuring the characteristics in terms of screen size and moisture content of a carbonizable material to be carbonized whereby said carbonizable material is typified according to the pilot runs, and carbonizing in a production run said carbonizable material according to the conditions determined for its carbonization during the pilot runs.

4. A method of applying desirable conditions to treat a given material in a continuous process of carbonization wherein said material is passed in a progressive path through a carbonizing chamber in the form of a relatively thin bed, air is supplied to the bed and volatile constituents of the material are burned selectively to supply the heat of carbonization, comprising, carrying out several runs in which the material is passed through the chamber in the form of a bed, feeding air to a plurality of separate zones underneath the bed in amount to support combustion of the volatiles and to supply the heat of carbonization, adjusting the air supply until a high coking temperature is achieved which is nearly the same above the several zones after an initial zone, maintaining the air supply and the speed of progress of the material through said path at rates effective to reduce combustion of the fixed carbon substantially to a desired minimum, and obtaining measurements of the rates of air supply to each compartment under such conditions, carbonizing similar material on a production scale by passing it through the chamber and supplying air according to said measurements so as to reproduce said conditions.

5. A method of applying desirable conditions for treating a given material in a continuous process of carbonization wherein said material is passed in a progressive path through a carbonizing chamber in the form of a relatively thin bed, air is supplied to the bed and volatile constituents of the material are burned selectively to supply the heat of carbonization, comprising, carrying out several runs in which the material is passed through the chamber in the form of a bed, each run including feeding air to a plurality of separate zones underneath the bed to support combustion of the volatiles and to supply the heat of carbonization, adjusting the air feed until a high coking temperature is achieved which is nearly the same above the several zones after an initial zone, maintaining the air supply and the speed of progress of the material through said path at rates effective to reduce combustion of the fixed carbon substantially to a desired minimum, then obtaining measurements of the rates of air supply to each zone under such conditions, the measurements being substantially independent of the resistance of the grate and the bed to the flow of air therethrough thereby to establish a pattern of operation for the carbonization under optimum conditions of that particular type of material.

6. A continuous process of carbonization wherein carbonizable material is advanced in a progressive path through a carbonizing chamber in the form of a relatively thin bed, air is supplied to the bed and volatile constituents of the material are burned selectively at least partially within the bed to supply the heat of carbonization, comprising, supplying the air independently to each of a plurality of separate zones in said path in amount to effect combustion of the volatiles, setting the air supply to each zone at a rate substantially proportionate to the rate of volatiles released from that zone to maintain a high coking temperature which is nearly the same in the several zones after an initial zone whereby a substantial uniformity of volatile burned is maintained throughout said path, and maintaining the air supply and the speed of progress of the material through said path at rates effective to reduce combustion of the fixed carbon substantially to a desired minimum.

A. H. ANDERSEN.
N. R. FASKEN.

CERTIFICATE OF CORRECTION.

Patent No. 2,380,930.               August 7, 1945.

ARTHUR HOIJORD ANDERSEN, ET AL.

It is hereby certified that error appears in the printed specification of the above numbered patent requiring correction as follows: Page 5, first column, line 49, for "undesirable" read --desirable--; and that the said Letters Patent should be read with this correction therein that the same may conform to the record of the case in the Patent Office.

Signed and sealed this 19th day of March. A. D. 1946.

Leslie Frazer
First Assistant Commissioner of Patents.

(Seal)

in the form of a relatively thin bed, air is supplied to the bed and volatile constituents of the material are burned selectively at least partially within the bed to supply the heat of carbonization, comprising, supplying the air independently to each of a plurality of separate zones in said path in amount to effect combustion of the volatiles, setting the air supply to each zone at a rate substantially proportionate to the rate of volatiles released from that zone to maintain a high coking temperature which is nearly the same in the several zones after an initial zone whereby a substantial uniformity of volatile burned is maintained throughout said path, and maintaining the air supply and the speed of progress of the material through said path at rates effective to reduce combustion of the fixed carbon substantially to a desired minimum.

A. H. ANDERSEN.
N. R. FASKEN.

CERTIFICATE OF CORRECTION.

Patent No. 2,380,930.

August 7, 1945.

ARTHUR HOIJORD ANDERSEN, ET AL.

It is hereby certified that error appears in the printed specification of the above numbered patent requiring correction as follows: Page 5, first column, line 49, for "undesirable" read --desirable--; and that the said Letters Patent should be read with this correction therein that the same may conform to the record of the case in the Patent Office.

Signed and sealed this 19th day of March. A. D. 1946.

(Seal)

Leslie Frazer
First Assistant Commissioner of Patents.